United States Patent
Lee

(10) Patent No.: US 6,466,531 B1
(45) Date of Patent: Oct. 15, 2002

(54) DISC DISCRIMINATOR OF OPTICAL DISC PLAYER SYSTEM

(75) Inventor: Jae-Hong Lee, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 782 days.

(21) Appl. No.: 08/829,417

(22) Filed: Mar. 31, 1997

(30) Foreign Application Priority Data

Apr. 19, 1996 (KR) .............................................. 96-11966

(51) Int. Cl.[7] ................................................ G11B 7/00
(52) U.S. Cl. .................................... 369/53.2; 369/53.23
(58) Field of Search .......................... 369/58, 59, 275.3, 369/94, 32, 44.27, 44.41, 53.2, 53.23

(56) References Cited

U.S. PATENT DOCUMENTS

| | | | |
|---|---|---|---|
| 4,850,695 A | * 7/1989 | Mikuriya et al. | 369/44.14 |
| 5,003,521 A | * 3/1991 | Yoshida et al. | 369/44.25 |
| 5,235,581 A | * 8/1993 | Miyagawa et al. | 369/44.12 |
| 5,263,011 A | * 11/1993 | Maeda et al. | 369/94 |
| 5,446,565 A | * 8/1995 | Komma et al. | 369/94 |
| 5,487,060 A | * 1/1996 | Rosen et al. | 369/94 |
| 5,608,715 A | * 3/1997 | Yokogawa et al. | 369/94 |
| 5,684,773 A | * 11/1997 | Hayashi | 369/58 |
| 5,696,743 A | * 12/1997 | Kawasaki et al. | 369/94 |

FOREIGN PATENT DOCUMENTS

| | | |
|---|---|---|
| JP | 58-155524 | 9/1983 |
| JP | 4-82051 | 3/1992 |

OTHER PUBLICATIONS

Nikkei Electronics No. 648; Nov. 6, 1995; pp. 163–170.
Nikkei Electronics No. 630; Feb. 27, 1995; pp. 94–100.

* cited by examiner

Primary Examiner—Nabil Hindi
(74) Attorney, Agent, or Firm—Sughrue Mion, PLLC

(57) ABSTRACT

A disc discriminator of an optical disc player system is disclosed. The disc discriminator has a 4-split photodetector for converting the beam concentrated by the optical pickup unit into an electric signal by means of a plurality of photo diodes divided into first through fourth quadrants. A push-pull signal generator is provided for amplifying a difference between signals generated from two pairs of photo diodes which are symmetrical in the upper and lower sides from the center of a track direction, and generating a push-pull signal. A comparator compares the push-pull signal generated from the push-pull signal generator with a predetermined reference voltage, and generates a digital video disc/compact disc discrimination signal discriminating between a digital video disc having the thickness of 0.6 mm and a compact disc having the thickness of 1.2 mm.

6 Claims, 5 Drawing Sheets

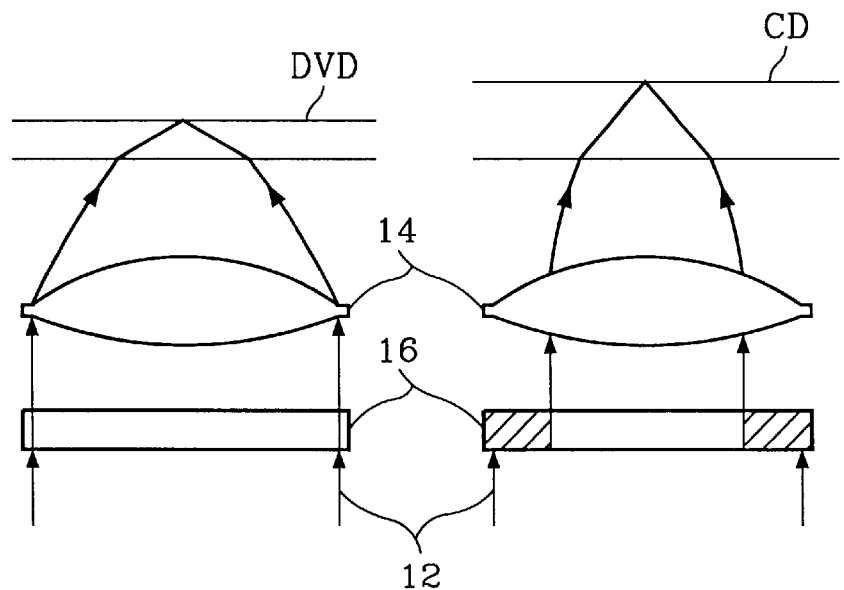
*Fig. 1A*   *Fig. 1B*
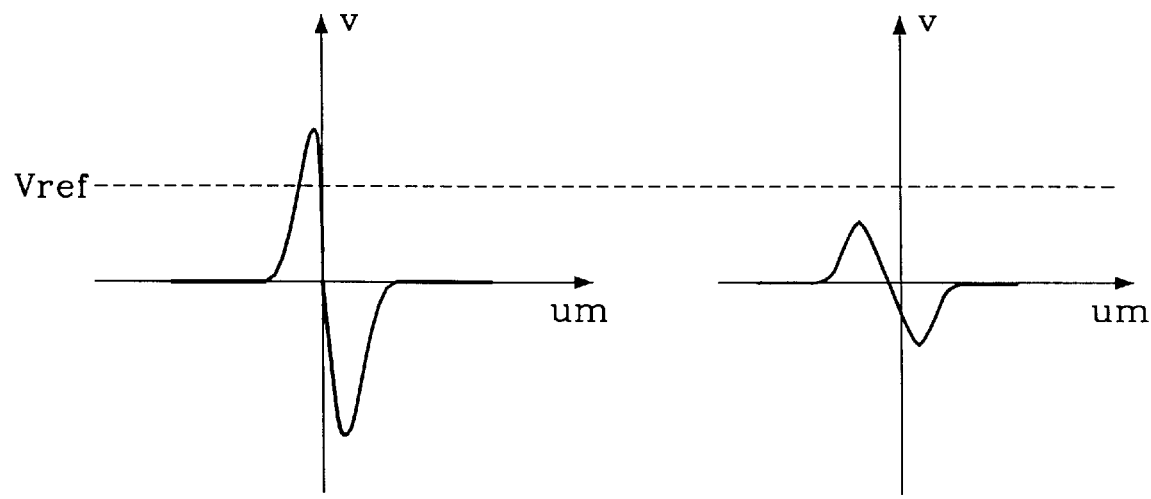
*Fig. 2A*   *Fig. 2B*

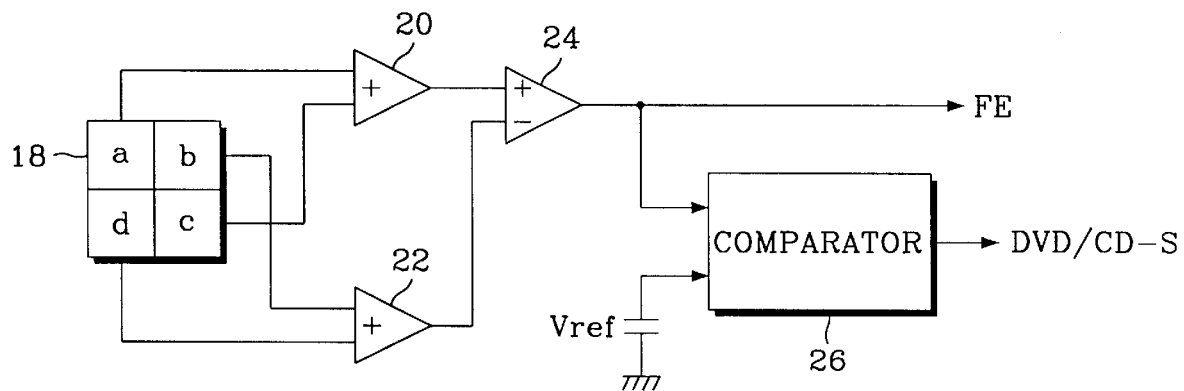
*Fig. 3*
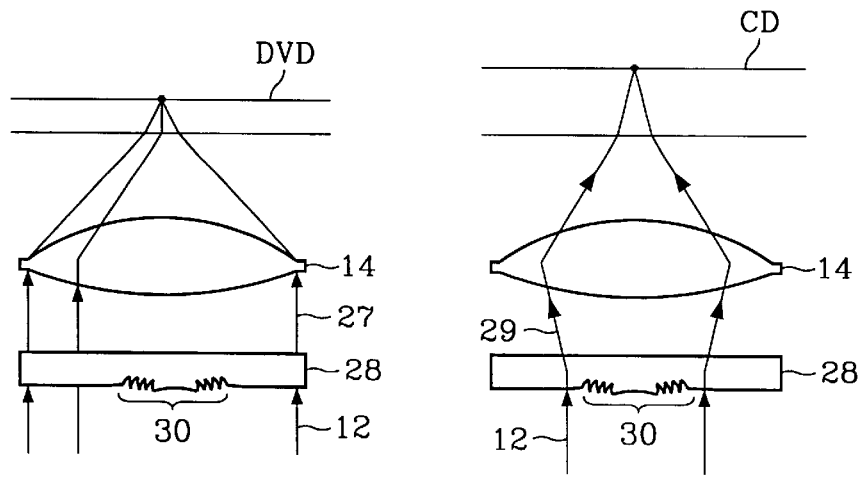
*Fig. 4A*  *Fig. 4B*

DISC DISCRIMINATOR OF OPTICAL DISC PLAYER SYSTEM

BACKGROUND OF THE INVENTION

1. Field of the Invention

The present invention relates to a- disc discriminator of an optical disc player system, and more particularly, to an apparatus for automatically discriminating between a digital video disc (DVD) and a compact disc (CD) installed in a digital video disc/compact disc (DVD/CD) compatible player system. The present application is based on Korean Application No. 11966/1996, which is incorporated herein by reference.

2. Description of the Related Art The growth of multimedia systems drives the progress in optical disc player systems. For example, a recently developed DVD [or SD (Super Density Disc)] player is capable of recording and reproducing a moving image and an audio signal of high quality. The DVD satisfies the MPEG-2 (Motion Picture Experts Group-2) specification and is compatible with the video CD based on the MPEG-1(Motion Picture Experts Group-1) specification. The thickness of the DVD substrate was chosen as 0.6 mm in consideration of the mechanical strength of the substrate against deformation of the disc and the compatibility with the CD. The thickness of the general CD is 1.2 mm. The compatibility between the DVD and the CD is motivated by the fact that much of the software that has been developed and is available on the market uses the format of the CD.

In order to reproduce information recorded in the DVD and the CD by means of a single optical disc player system, an optical pickup unit for accurately reading information recorded on either a disc having a substrate thickness of 0.6 mm or a disc having a substrate thickness of 1.2 mm is required. Additionally, a disc discriminator for identifying the kind of the disc loaded in the player is necessarily required. The DVD/CD compatible optical pickup units are classified into two systems, one class uses a liquid crystal shutter and the other class uses a hologram element.

FIGS. 1A and 1B are diagrams illustrating a disc reading operation using the DVD/CD compatible optical pickup unit employing the liquid crystal shutter. As shown in FIGS. 1A and 1B, the DVD/CD compatible optical pickup unit using the liquid crystal shutter is capable of changing the diameter of the laser beam projected on the objective lens. FIG. 1A shows the case wherein the DVD having the substrate of thickness of 0.6 mm is installed and the liquid crystal shutter is not driven, i.e., the liquid crystal shutter is off. FIG. 1B shows the case wherein the CD having the substrate of thickness of 1.2 mm is installed and the liquid crystal shutter is on.

Referring to FIGS. 1A and 1B, a reference numeral 12 indicates a laser beam generated from the semiconductor laser generator (hot shown) and a reference numeral 14 indicates an objective lens. A reference numeral 16 denotes a liquid crystal shutter which is used for changing the diameter of the laser beam and projecting it on the objective lens 14 by means of an "on/off" operation.

The above principle depends on the fact that the focal distance of the objective lens 14 differs according to the diameter of the laser beam projected thereon. For example, as shown in FIG. 1A, when the liquid crystal shutter 16 is off, the diameter of the laser beam 12 is about the same as the diameter of the objective lens 14, and the focal distance of the objective lens 14 becomes short. If the liquid crystal shutter 16 is turned on, the diameter of the laser beam projected on the objective lens 14 becomes narrower. Thus, the focal distance of the objective lens 14 increases.

As can be understood from the above, the liquid crystal shutter 16 should be appropriately driven according to the kind of the disc to be reproduced. That is, it is necessary to identify the kind of disc installed in the optical disc player system. The discrimination between the discs inserted in the optical disc player is achieved by detecting the level of a focusing search signal picked up from the disc by means of the optical pickup unit. The focusing search signal appearing as a form shown in FIGS. 2A and 2B is obtained from a focusing error signal FE. Thus, conventionally the focusing error signal FE is also used for discriminating between the discs by comparing its level to a reference voltage as will be further explained below.

FIGS. 2A and 2B are wave forms of the focusing search signal while the DVD/CD is reproduced by switching off and on the liquid crystal shutter shown in FIG. 1. Referring to FIGS. 2A and 2B, a micro meter $\mu m$ in a horizontal axis denotes focus inconformity and a volt "V" in a vertical axis denotes the amplitude of the focusing search signal.

FIG. 2A illustrates a wave form of the focusing search signal while the DVD having the thickness of 0.6 mm is being reproduced by switching off the liquid crystal shutter 16 of the DVD/CD compatible optical pickup unit. FIG. 2B illustrates a wave form of the focusing search signal while the CD of 1.2 mm is being reproduced by switching on the liquid crystal shutter 16 of the DVD/CD compatible optical pickup unit. When the CD of 1.2 mm is reproduced by switching on the liquid crystal shutter 16 of the DVD/CD compatible optical pickup unit, the level of the focusing search signal becomes low and the degree of the focus inconformity becomes large, owing to spherical aberration. That is, as shown in FIG. 1A, if the DVD disc is replaced by a CD while the liquid crystal shutter 16 is maintained off, the laser beam passing through the objective lens is projected on the recording surface of the CD. However, since the CD is twice as thick as the DVD, spherical aberration reduces the level of the pickup signal.

FIG. 3 is a block diagram of a conventional disc discriminator which is used for explaining how the DVD/CD player discriminates between the discs using the focusing search signal shown in FIGS. 2A and 2B. There are provided a 4-split photo-detector 18, first and second adders 20 and 22, a differential amplifier 24, and a comparator 26. The 4-split photo-detector 18 consists of first to fourth quadrantal photo diodes a, b, c, and d for receiving the laser: beam picked up through the objective lens 14, the liquid crystal shutter 16 and a beam splitter (not shown), and generating an electrical signal. The first adder 20 adds the output of the first quadrantal photo diode a of the 4-split photo diode 18 to an output of the third quadrantal photo diode c thereof. The second adder 22 adds the output of the second quadrant photo diode "b" to an output of the fourth quadrantal photo diode d. The differential amplifier 24 differential-amplifies a difference between the outputs of the first and second adders 20 and 22 and then generates the focusing error signal FE. The comparator 26 compares the focusing error signal FE to a predetermined reference voltage Vref and then generates a disc discrimination signal DVD/CD-S of the DVD/CD. The reference voltage Vref in the comparator 26 is set up to discriminate the level of a focus signal of the focusing search signal when the DVD and the CD are reproduced as shown in FIGS. 2A and 2B. The reference voltage Vref is lower than the level of the focusing search signal when the DVD is reproduced, and it is higher than the level of the focus signal of the focusing search signal when the CD is reproduced. Here, all constructions, except the comparator 26, are being currently applied to the generally produced CD players. Thus, in the following description, there will be explained within the scope of the present invention only an operation to discriminate between the DVD and the CD.

If the information recorded in the disc is reproduced under a situation that the liquid crystal shutter 16 of the DVD/CD compatible optical pickup unit is off, the laser beam reflected from the disc is projected onto the upper surface of the 4-split photo-detector 18 shown in FIG. 3. At this time, the form of the laser beam differs according to the tracking state of the optical pickup unit. The first adder 20 adds the signals generated from the first and third quadrantal photo diodes a and c of the 4-split photo-detector 18 and then generates an added signal "a+c". The second adder 22 adds the signals generated from the second and fourth quadrantal photo diodes b and d of the 4-split photo-detector 18 and then generates an added signal "b+d". The differential amplifier 24 receives the added signals generated from the first and second adders 20 and 22 and amplifies a difference "(a+c)−(b+d)" between the two signals and then generates the focusing error signal FE which is used as the focusing search signal like FIG. 2A or FIG. 2B. The detected focusing search signal is supplied to a comparing voltage terminal of the comparator 26 to which the predetermined reference voltage Vref is applied. The comparator 26 compares the reference voltage Vref with a voltage of the detected focusing search signal. If the voltage of the focusing search signal is higher than the reference voltage Vref, the comparator 26 generates a DVD disc discrimination signal, for example, the logic "high" through an output terminal DVD/CD-S. On the other hand, if the voltage of the focusing search signal is lower than the reference voltage Vref, the comparator 26 generates a signal at the logic "low", which is used for indicating that the CD is reproduced.

However, the compatible DVD/CD discriminator shown in FIG. 3 is inadequate when applied to a system using the hologram element. The problem will be explained hereinafter.

FIGS. 4A and 4B are diagrams illustrating how a disc reproducing operation is performed using the conventional DVD/CD compatible optical pickup unit using the hologram element. A reference numeral 28 denotes a hologram lens having a hologram lattice pattern. FIG. 4A shows an operating state when reproducing the DVD of 0.6 mm. FIG. 4B shows an operating state when reproducing the CD of 1.2 mm. As shown in FIGS. 4A and 4B, the DVD/CD compatible optical pickup unit using the hologram element diffracts the laser beam 12 generated from the semiconductor laser generator (not shown) by means of a lattice pattern 30 of the hologram lens 28 and projects it on the objective lens 14, thereby changing the focus distance of the objective lens 14. The lattice pattern 30 of the hologram lens 28 is formed in the shape of sawedged prominence and depression.

In FIG. 4A, the laser beam 27 which is not diffracted in the hologram lens 28 is focused on the DVD of 0.6 mm by means of the objective lens 14, so that the information recorded on the DVD is reproduced. Further, the laser beam 29 which is diffracted by the hologram lattice pattern 30 of the hologram lens 28 is projected on the objective lens 14, as shown in FIG. 4B. The focus distance of the objective lens 14 becomes longer as shown in FIG. 4B. At this time, if the intensity of the laser beam diffracted by the hologram lattice pattern 30 is lowered, the focusing search signal during the reproduction of the DVD and the CD is as shown in FIGS. 5A and 5B, so that the type of the disc installed can be identified by using the circuit of FIG. 3. However, the optical efficiency of the optical pickup unit using the hologram lens reaches to just about 20% of the general optical pickup unit. Thus, many problems may arise owing to the low intensity of the light reflected from the CD. In order to prevent the reduction in intensity, the lattice pattern of the hologram element 28 is adjusted to relatively increase the intensity of the primary diffracted beam from the hologram lens 28.

When the DVD and the CD are reproduced by increasing the intensity of the primary diffracted beam, each of the focusing search signals of the DVD and the CD becomes large as shown in FIGS. 6A and 6B. However, if the intensity of the primary diffracted beam is increased, the levels of the focusing search signals of the two discs are similar to each other. Consequently, it is difficult to discriminate between the DVD and the CD by the circuit of FIG. 3. Further, when the intensity of the primary optical beam diffracted from the hologram lens 28 is high, it is hard to set up the reference voltage Vref supplied to the comparator 26 so as to discriminate between the DVD and the CD, since the levels of the focusing search signals are similar to each other during the reproduction of the DVD and the CD.

SUMMARY OF THE INVENTION

It is therefore an object of the invention to provide a circuit for accurately identifying the type of a disc loaded in an optical player system having a DVD/CD compatible optical pickup unit using a hologram element.

It is another object of the invention to provide a circuit for automatically discriminating between a DVD and a CD by detecting a tracking error signal of a push-pull method.

It is still another object of the invention to provide a disc discriminator of an optical disc player system using a DVD/CD compatible optical pickup unit of a hologram element wherein the focusing search signals for 0.6 mm and 1.2 mm discs have similar level.

In order to achieve these objects of the present invention, a disc discriminator of an optical disc player system having an optical pickup unit of a hologram element for focusing an incident laser beam onto a disc and concentrating the beam reflected therefrom includes: a 4-split photo-detector for converting the beam concentrated by the optical pickup unit into an electric signal by means of a plurality of photo diodes divided in first through fourth quadrants; a push-pull signal generator for amplifying a difference between signals generated by two pairs of photo diodes which are symmetrical in the upper and lower sides from the center of a track direction among the 4-split photo-detector, and generating a push-pull signal; and a comparator for comparing the push-pull signal generated from the push-pull signal generator with a predetermined reference voltage, and generating a digital video disc/compact disc discrimination signal discriminating between a digital video disc having the thickness of 0.6 mm and a compact disc having the thickness of 1.2 mm.

BRIEF DESCRIPTION OF THE DRAWINGS

The above and other objects, advantages and features of the present invention will be more apparent from the following detailed description taken with the attached drawings in which:

FIGS. 1A and 1B are diagrams illustrating a disc reproducing operation using a conventional DVD/CD compatible optical pickup unit employing a liquid crystal shutter;

FIGS. 2A and 2B are wave form diagrams of a focusing search signal while switching off and on the liquid crystal shutter shown in FIGS. 1A and 1B;

FIG. 3 is a block diagram of a conventional disc discriminator which is used for explaining how a disc in the DVD/CD compatible optical pickup unit is identified by use of the focusing search signal shown in FIGS. 2A and 2B;

FIGS. 4A and 4B are diagrams illustrating how a disc reproducing operation is performed by a conventional DVD/CD compatible optical pickup unit having a hologram element;

DETAILED DESCRIPTION OF THE PREFERRED EMBODIMENT

Figure 5A:
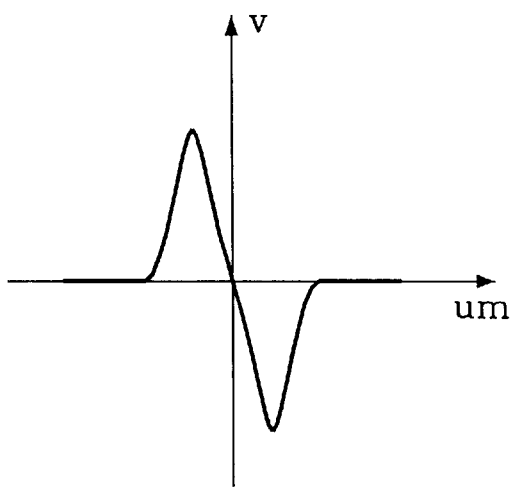
FIGS. 5A and 5B are waveform diagrams of the focusing search signal during the reproduction of a DVD and a CD using the optical pickup unit of the hologram element when the size of the primary diffracted optical beam is small.
Figure 5B:
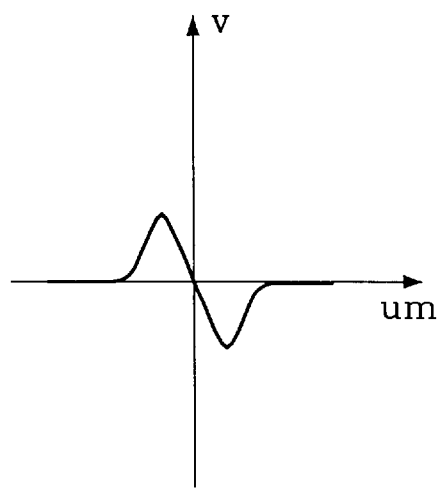
Figure 6A:
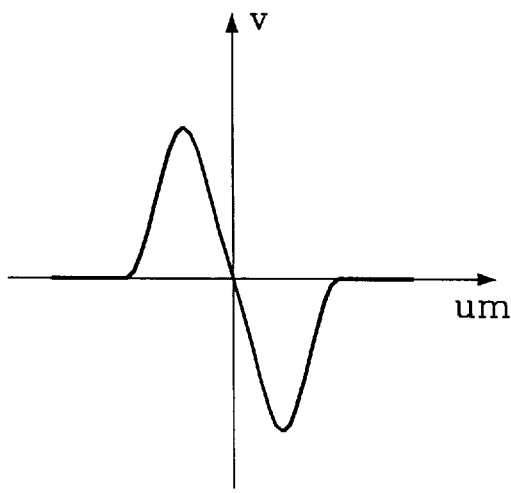
FIGS. 6A and 6B are wave form diagrams of the focusing search signal during the reproduction of the DVD and the CD, by using the optical pickup unit utilizing the hologram element, when the intensity of the first primary diffracted optical beam is large.
Figure 6B:
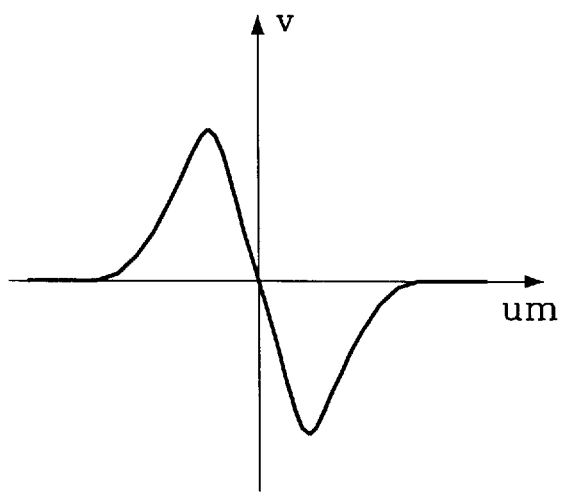

In the following description, specific details are set forth to provide a more thorough understanding of the present invention. It will be apparent, however, to one skilled in the art, that the present invention may be practiced without these specific details. In other instances, well known features have not been described in detail so as not to obscure the present invention. In drawings, the same reference numerals indicate the same constructions and functions.

Figure 7:
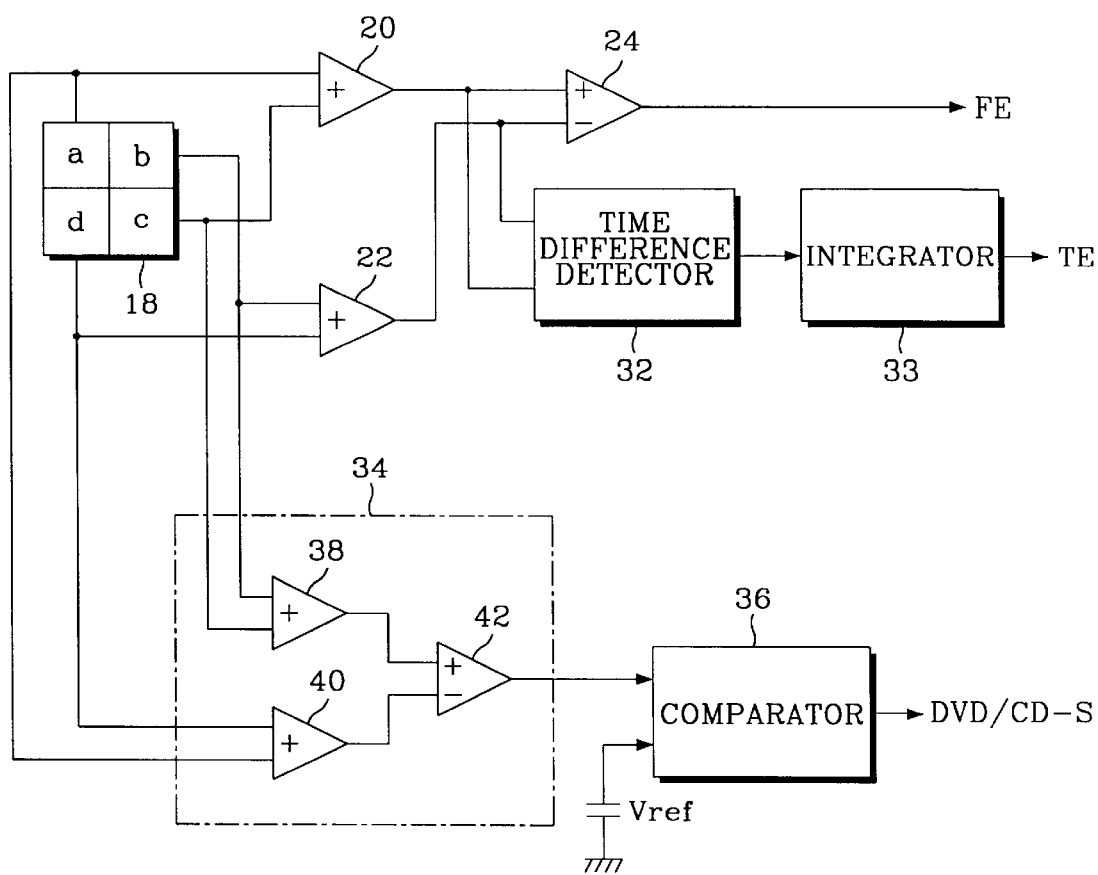
FIG. 7 is a block diagram of a disc discriminator of an optical disc player system according to the present invention, which is used for explaining how the DVD and the CD are discriminated by use of a push-pull signal.

FIG. 7 is a block diagram of a disc discriminator of an optical disc player system according to a preferred embodiment of the present invention. In FIG. 7, a system is depicted wherein a DVD and a CD are discriminated by use of a push-pull signal. In the system there are provided a 4-split photo-detector 18, first and second adders 20 and 22, a differential amplifier 24, a time difference detector 32, an integrator 33, a push-pull signal generator 34, and a comparator 36. The 4-split photo-detector 18 generates an electric signal corresponding to the intensity of a beam projected on a plurality of photo diodes which are each disposed in the first, second, third and fourth quadrants. The first and second adders 20 and 22 add signals generated from two pairs of photo diodes which are diagonally disposed with respect to each other and the track direction. The differential amplifier 24 amplifies a difference between first and second added signals generated from the first and second adders 20 and 22, and then generates a focusing error (FE) signal. The time difference detector 32 detects an output time difference between the first and second added signals. The integrator 33 integrates a signal generated from the time difference detector 32 and then generates a tracking error (TE) signal.

The push-pull signal generator 34 amplifies a difference between signals each generated from. two pairs of photo diodes which are disposed linearly with respect to each other and the track direction, and then generates a push-pull signal. The comparator 36 compares the push-pull signal generated from the push-pull signal generator 34 with a predetermined reference voltage Vref and then generates a DVD/CD discrimination signal for discriminating between the DVD of the thickness of 0.6 mm and the CD of the thickness of 1.2 mm.

The push-pull signal generator 34 includes adders 38 and 40, and a differential amplifier 42. The adders 38 and 40 add signals generated from the two pairs of photo diodes which are disposed linearly with respect to the center of the track direction. The differential amplifier 42 amplifies a difference between the signals generated from the adders 38 and 40, and then generates the push-pull signal. The reference voltage Vref set up in the comparator 36 may have a wider range than that described with reference to FIGS. 2A and 2B, or it may have the same setting range as FIGS. 2A and 2B. For example, when reproducing information recorded in the disc of the thickness of 1.2 mm, the reference voltage Vref is higher than the level of the focusing search signal. On the other hand, when reproducing information recorded in the disc of the thickness of 0.6 mm, the reference voltage Vref is lower than the level of the focusing search signal.

Figures 8A, 8B:
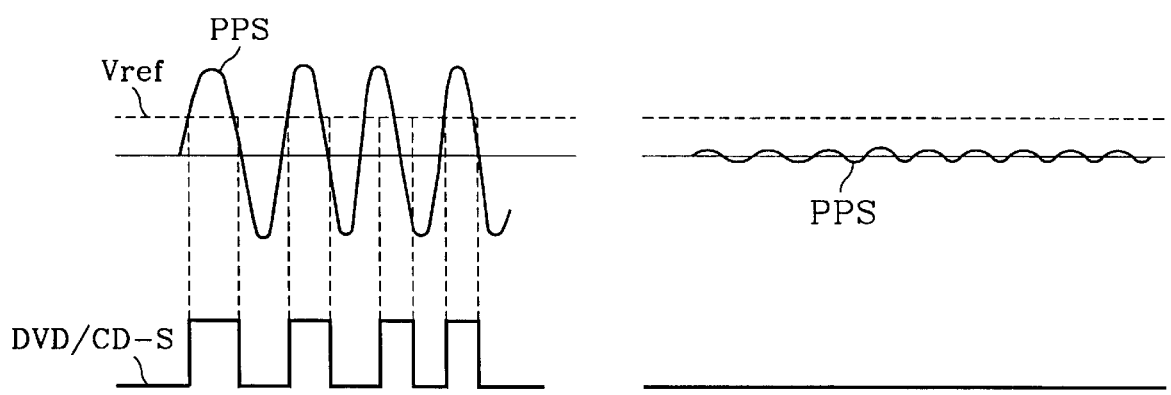
FIGS. 8A and 8B are wave form diagrams illustrating an operation of the discriminator shown in FIG. 7.

FIGS. 8A and 8B show wave forms for explaining an operation of the DVD/CD discriminator shown in FIG. 7. FIG. 8A is a wave form illustrating the push-pull signal and the output of the comparator 36 when the DVD of 0.6 mm is reproduced. FIG. 8B is a wave form illustrating the push-pull signal and the output of the comparator 36 when the CD of 1.2 mm is reproduced.

Hereinafter, there will be explained an operation of the disc discriminator of the optical disc player system with reference to FIGS. 8A and 8B. The explanation will be made on the assumption that the CD of 0.6 mm or the DVD of 1.2 mm is loaded into the optical disc player system having the optical pickup unit of the hologram element.

If the information recorded in the CD or the DVD is picked-up by the DVD/CD compatible optical pickup unit, the information, i.e. optical beam, is transmitted onto the upper surface of the four photo diodes, each disposed in the first through fourth quadrants of the 4-split photo-detector 18 shown in FIG. 7.

A focusing error detector, including the adders 20 and 22 which are connected to the pairs of photo diodes positioned diagonally in the right and left sides of the track direction and the differential amplifier 24, generates the focusing error signal FE, as mentioned with reference to FIG. 3. The time difference detector 32 receives the outputs of the adders 20 and 22 and detects the output time difference between the adders 20 and 22. The integrator 33, connected to an output terminal of the time difference detector 32, integrates a time difference detecting signal generated from the time difference detector 32 and then outputs the tracking error signal TE. The focusing error signal FE is used for adjusting the objective lens in the upper and lower direction by controlling the current of an operative coil within the optical pickup unit. The tracking error signal TE is used for controlling a bobbin within the optical pickup unit in the right and left sides.

Meanwhile, in the push-pull signal generator 34, the adder 38 receives the outputs of the second and third photo quadrantal diodes and generates a third added signal "b+c". The adder 40 receives the outputs of the first and fourth quadrantal photo diodes, and generates-a fourth added signal "a+d". The differential amplifier 42, having a noninverting terminal "+" and an inverting terminal "−" connected to output nodes of the adders 38 and 40, amplifies a difference between the third and fourth added signals and generates a signal "PPS=(b+c)-(a+d)". The differential amplifying signal PPS generated from the differential amplifier 42 is shown in FIG. 8A and FIG. 8B according to the state of the disc inserted in the player.

For example, in the case of reproducing the DVD of 0.6 mm, the differential amplifying signal PPS is generated as a sine wave of a predetermined size, as shown in FIG. 8A. However, in case of reproducing the CD of 1.2 mm, the differential amplifying signal PPS is generated at approximately "0" level, as shown in FIG. 8B. When the DVD of 0.6 mm is loaded in the player, the output of the differential amplifier 42 reaches approximately to "0" during the on-track in the same way as a general push-pull tracking. If the laser beam from the optical pickup unit deviates from the center of the disc track in the direction of the right and left sides, the beam transmitted onto the 4-split photo-detector 18 is slanted to the first and fourth quadrantal photo diodes a and d, or on the second and third quadrant photo diodes b and c. As a result, the output of the differential amplifier 42 is generated, as shown in FIG. 8A, at a level "−" or a level "+". On the other hand, if the CD of 1.2 mm is loaded in the player, the output PPS of the differential amplifier 42 is generated at approximately "0" level.

The wave length of a laser diode used in the CD of 1.2 mm is approximately 780 nm. Further, the depth of an information mark recorded in the CD is approximately 0.1 $\mu$m. In this case, since the difference in the beam's intensity between a part where the information mark exists and the other part where the information mark doesn't exist can be obtained, it is possible to obtain the tracking error signal. However, in the case that the information of the CD is read by the laser diode of the wave length of 650 nm used in the DVD player, the. push-pull signal can not be used as the tracking signal because the push-pull tracking error signal becomes "0" due to mutual interference when the depth of the information mark is a quarter of the wave length. That is, the depth 0.1 $\mu$m of the information mark of the CD corresponds to ¼ of the wave length 650 nm of the laser diode which is used in the DVD player, so that the output of the differential amplifier 42 is generated at approximately "0" level.

Thus, if the DVD is loaded in the player, the differential amplifier 42 shown in FIG. 7 generates a sine wave swung in the direction of "−" or "+", as shown in FIG. 8A. On the other hand, if the CD is loaded in the player, the differential amplifier 42 is generated at nearly "0" level, as shown in FIG. 8B. The differential amplifying signal PPS is supplied to the comparator 36 to which the predetermined reference voltage Vref is applied as shown in FIGS. 8A and 8B.

The comparator 36 compares the differential amplifying signal PPS with the reference voltage Vref and then generates the discriminating signal of the DVD or the CD. For example, if the input signal is of the DVD is reproduced, the comparator 36 generates the DVD discriminating signal swung in a; pulse form. If the CD is reproduced, the comparator 36 generates the CD discriminating signal of "0" level.

As mentioned above, in the optical disc player system using the DVD/CD compatible optical pickup unit of the hologram element and having the focusing search signals which are similar to each other in the discs of 0.6 mm and 1.2 mm, a discriminating system is provided which can rapidly and accurately identify whether the loaded disc is a DVD or a CD as soon as the disc is loaded to the tray of the player. As a result, the information recorded in the DVD and the CD can be reproduced without an additional switching operation, so that the user can easily utilize the system.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A disc discriminator of an optical disc player system having an optical pickup unit using a hologram element for focusing an incident laser beam onto a disc and concentrating said beam reflected therefrom, comprising:

a 4-split photo-detector for converting said beam, concentrated by said optical pickup unit upon reflection, into an electric signal by means of a plurality of photo diodes divided in first through fourth quadrants;

a push-pull signal generator for amplifying a difference between two signals, each signal generated from a respective pair of photo diodes and each respective pair of photo diodes disposed symmetrically on a respective side of a center of a track direction, and generating a push-pull signal; and a comparator for comparing said push-pull signal generated from said push-pull signal generator to a predetermined reference voltage, and generating a digital video disc/compact disc discrimination signal discrimination between a digital video disc and a compact disc.

2. The disc discriminator of an optical disc player system as claimed in claim 1, wherein said push-pull signal generator comprises:

a first adder for adding two signals generated from a first pair of photo diodes which are disposed linearly on one side of the center of a track direction; and a second adder for adding another two signals generated from a second pair of photo diodes which are disposed linearly on another side of the center of a track direction across from the first pair of diodes; and a differential amplifier for amplifying a difference between signals generated from said first and second adders and generating said push-pull signal.

3. The disc discriminator of an optical disc player system as claimed in claim 1 or 2, wherein said reference voltage set in said comparator is higher than a level of said push-pull signal when a disc having thickness of 1.2 mm is read, but is lower than the level of said push-pull signal when a disc having thickness of 0.6 mm is read.

4. A disc discriminator of an optical disc player system having an optical pickup unit of a hologram element for focusing an incident laser: beam onto a disc and concentrating said beam reflected therefrom, comprising:

a 4-split photo-detector for converting said beam, concentrated by said optical pickup unit upon reflection, into an electric signal by means of a plurality of photo diodes divided into first through fourth quadrants;

a first adder for adding two signals generated from a first pair of photo diodes which are disposed across a track direction;

a second adder for adding two signals generated from a second pair of photo diodes which are disposed diagonally across the track direction complementing the disposition of the first pair;

a differential amplifier for amplifying a difference between first and second added signals generated from said first and second adders and generating a focusing error signal;

a tracking error detector for detecting and integrating an output time difference between said first and second added signals and generating a tracking error signal;

a push-pull signal generator for amplifying a difference between two signals, each generated from two pairs of photo diodes which are disposed linearly across the center of a track direction, and generating a push-pull signal; and a comparator for comparing said push-pull signal generated from said push-pull signal generator with a predetermined reference voltage, and generating a digital video disc/compact disc discrimination signal discriminating between a digital video disc and a compact disc.

5. The disc discriminator of an optical disc player system as claimed in claim 4, wherein said push-pull signal generator comprises:

a third adder for adding two signals generated from a pair of photo diodes one of which belonging to the first pair and the other belonging to the second pair;

a fourth adder for adding two signals generated from another pair of photo diodes one of which belonging to the first pair and the other belonging to the second pair; and said differential amplifier for amplifying a difference between signals generated from said third and fourth adders and generating a push-pull signal.

6. The disc discriminator of an optical disc player system as claimed in claim 4 or 5, wherein said reference voltage set in said comparator is higher than a level of said push-pull signal when a disc having thickness of 1.2 mm is read, but is lower than the level of said push-pull signal when a disc having thickness of 0.6 mm is read.

* * * * *